United States Patent
Mesa

(10) Patent No.: US 9,004,766 B1
(45) Date of Patent: Apr. 14, 2015

(54) AXIAL CONTROL ASSEMBLY

(71) Applicant: Gilberto Mesa, Miami, FL (US)

(72) Inventor: Gilberto Mesa, Miami, FL (US)

( * ) Notice: Subject to any disclaimer, the term of this patent is extended or adjusted under 35 U.S.C. 154(b) by 0 days.

(21) Appl. No.: 13/958,371

(22) Filed: Aug. 2, 2013

Related U.S. Application Data

(60) Provisional application No. 61/827,176, filed on May 24, 2013.

(51) Int. Cl.
| | |
|---|---|
| F16C 21/00 | (2006.01) |
| F16C 33/58 | (2006.01) |
| F16C 19/30 | (2006.01) |
| F16C 19/46 | (2006.01) |
| F16C 19/36 | (2006.01) |
| F16C 33/60 | (2006.01) |

(52) U.S. Cl.
CPC ............. *F16C 19/30* (2013.01); *F16C 2226/62* (2013.01); *F16C 33/581* (2013.01); *F16C 19/46* (2013.01); *F16C 19/36* (2013.01); *F16C 33/605* (2013.01)

(58) Field of Classification Search
USPC ......... 384/127, 261, 266, 494, 519, 585, 618, 384/900, 564–565
See application file for complete search history.

(56) References Cited

U.S. PATENT DOCUMENTS

| | | | |
|---|---|---|---|
| 1,916,233 A | 7/1933 | Riblet | |
| 2,259,325 A | 10/1941 | Robinson | |
| 2,888,303 A * | 5/1959 | Mempel | 384/480 |
| 2,998,287 A * | 8/1961 | Pritchett | 384/466 |
| 3,033,597 A * | 5/1962 | Miller | 411/427 |
| 3,108,670 A * | 10/1963 | Habicht | 192/27 |
| 3,262,526 A * | 7/1966 | Kramer | 192/38 |
| 3,596,533 A * | 8/1971 | Nightingale | 384/127 |
| 3,656,825 A | 4/1972 | Manger | |
| 3,881,792 A | 5/1975 | Orain | |
| 4,204,589 A * | 5/1980 | Loker et al. | 464/33 |
| 4,658,848 A * | 4/1987 | Meyer et al. | 251/327 |
| 4,844,626 A * | 7/1989 | Colin | 384/127 |
| 4,915,511 A * | 4/1990 | Kotegawa et al. | 384/127 |
| 4,998,346 A | 3/1991 | Behrens | |
| 5,385,413 A | 1/1995 | Murphy et al. | |
| 5,746,517 A | 5/1998 | Durham et al. | |
| 6,012,985 A * | 1/2000 | Sukup | 464/37 |
| 6,416,231 B1 | 7/2002 | Verbrugge et al. | |
| 7,063,490 B2 * | 6/2006 | Ricker | 411/14 |
| 7,210,853 B2 | 5/2007 | Leimann | |
| 7,476,156 B2 | 1/2009 | Margerie | |
| 2011/0247890 A1* | 10/2011 | Stoehr et al. | 384/537 |

FOREIGN PATENT DOCUMENTS

SU 1423358 A * 9/1988 ............. B24B 41/04

* cited by examiner

*Primary Examiner* — Marcus Charles
(74) *Attorney, Agent, or Firm* — Malloy & Malloy, P.L.

(57) ABSTRACT

An axial control assembly comprises a bearing assembly and a bearing mount assembly, wherein the bearing mount assembly is structured to secure the bearing assembly in an operative configuration relative to a rotatable element of a mechanical device. The bearing assembly includes an inner bearing casing and an outer bearing casing structured to rotatably engage one another. The bearing mount assembly includes at least one axial control member disposed in an abutting relation to an axial load surface of one of the inner or outer bearing casing, and the axial control member is further positioned to counteract an axial load generated by a rotational movement of the rotational element of the mechanical device.

19 Claims, 4 Drawing Sheets

AXIAL CONTROL ASSEMBLY

BACKGROUND OF THE INVENTION

1. Field of the Invention

The present invention is directed to an axial control assembly which, in at least one embodiment, is utilized in conjunction with a bearing assembly in order to provide control over axial movement of the bearing assembly components relative to one another during operation. The axial control assembly includes a bearing mount assembly which, in at least one embodiment, secures a bearing assembly in an operative configuration relative to at least a portion of a rotatable element of a mechanical device.

2. Description of the Related Art

Bearing assemblies including one or more movable bearing disposed and moveable within a bearing race are utilized in countless mechanical devices worldwide. Ball bearing assemblies are among the most common type of movable bearing assemblies given the relative ease and cost effectiveness of manufacturing the same. However, ball bearing assemblies are not typically intended for continuous heavy duty loading as is required by many mechanical devices, and are prone to failure which can lead to expensive, and often avoidable, mechanical repairs.

Another common type of bearing assembly is a roller bearing assembly, wherein a plurality of roller bearings are disposed in an inner or outer roller bearing race, and the roller bearings are structured and dimensioned to contact a corresponding inner or outer race of the assembly. While roller bearings can provide considerably greater loading capacity to a transverse load, relative to ball bearings having similar diameter and material of construction, there is tendency for inner and outer roller bearing races to drift axially relative to one another which can also result in failure and costly repairs.

One mounting assembly for roller bearings includes an inner raceway and an outer raceway enclosing the plurality of bearings. The bearings are axially retained by a pair of retaining washers which are locked onto the inner race. The washers are maintained in their intended position by retaining rings and the washers are prevented from rotating while allowing the outer race to rotate relative to the inner face or surface of the retaining washers.

Another roller bearing assembly is of the type used with constant velocity joints for motor vehicles. Each roller bearing assembly comprises an inner ring and an outer roller, which collectively enclose a needle race. An axial retention assembly comprises two washers, which are disposed on different sides of the inner ring of the needle race. Each washer includes an annular central zone for axially retaining the needle race.

Yet another roller bearing assembly includes a plurality of cylinder rollers rotatably disposed between an outer race member and an inner race member. Rings are located at each end of the outer race member so as to axially retain the cylindrical rollers in an intended operating relationship relative to the raceway of the outer race member.

Known moveable bearing assemblies do not provide sufficient axial control for substantially similar loads to be placed on the bearing assembly in both transverse and axial directions. As such, it would be beneficial to provide an axial control assembly for a moveable bearing assembly which permits substantially similar loads to be placed on a bearing assembly in both axial and transverse directions. Yet another benefit may be realized by providing an axial control assembly which permits selective balancing of axial control versus freedom of movement of the components of a moveable bearing assembly. It would also be helpful for such an axial control assembly to be relatively simple and inexpensive to manufacture, to permit widespread usage of the axial control assembly. A further advantage may be realized from such an axial control assembly by facilitating lubrication of the roller bearings while in operation.

SUMMARY OF THE INVENTION

An axial control assembly in accordance with at least one embodiment of the present invention comprises a roller bearing assembly and a bearing mount assembly, wherein the roller bearing assembly is secured in an operative configuration by the bearing mount assembly. A roller bearing assembly comprises an inner bearing casing and an outer bearing casing wherein the outer bearing casing is disposed in an operative overlying relation to the inner bearing casing and, in one embodiment, a plurality of roller bearings are rotatably mounted in the bearing assembly to permit the inner and outer bearing casings to rotate relative to one another. In at least one embodiment, an outer bearing casing comprises a transverse load surface and at least one axial load surface, wherein the transverse load surface is disposed to counteract a transverse load generated by an external device.

The bearing mount assembly, in accordance with one embodiment of the present invention, comprises at least one axial control member. In at least one embodiment, an axial control member is disposed in an abutting relation to at least one axial load surface of an outer bearing casing while the bearing assembly is secured in an operative configuration by the bearing mount assembly, wherein the axial control member is positioned to counteract an axial load generated by an external device and to limit axial movement of an outer bearing casing relative to an inner bearing casing.

One embodiment of the present invention comprises an axial control member having at least one slip surface and at least one friction surface, the slip surface structured to engage an axial load surface of an outer bearing casing or a portion of either a first or second bearing mount member. In at least one further embodiment, an axial control member comprises a pair of oppositely disposed slip surfaces, and in yet one further embodiment, an axial control member comprises a plurality of oppositely disposed friction surfaces.

Similarly, in at least one embodiment, an outer bearing casing comprises a pair of spaced apart and oppositely disposed axial load surfaces wherein each of the axial load surfaces comprises a friction surface, while in another embodiment each of the axial load surfaces comprises a friction surface, and in yet one further embodiment, the outer bearing casing comprises one axial load surface comprising a slip surface and another of the spaced apart and oppositely disposed axial load surfaces comprising a friction surface.

As will be appreciated from the foregoing, the present invention provides a wide variety of combinations of slip surfaces and friction surfaces between components which engage one another in an axial direction, thereby allowing an equally wide variety of control in an axial direction by selecting the combination of abutting slip surfaces and friction surfaces of the axial components to provide a desired level of axial control.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION

As noted above, the present invention is directed to an axial control assembly, generally as shown as 10 throughout the figures. In particular, in at least one embodiment, the present invention is directed to an axial control assembly 10 which is structured and disposed to operate in conjunction with a least a portion of a mechanical device. In yet one further embodiment, an axial control assembly 10 in accordance with the present invention is structured and disposed to be operatively engaged with a rotatable element of a mechanical device, and to facilitate a rotational movement of the rotatable element relative to the mechanical device itself.

As such, an axial control assembly 10 in accordance with the present invention comprises a bearing assembly, and in at least one embodiment, a roller bearing assembly 20, such as is shown in the illustrative embodiments presented herein. The utilization of a roller bearing assembly 20 is known in the art for use to counteract transverse forces acting on at least a portion of the roller bearing, thereby making a roller bearing assembly 20 particularly well suited for a number of rigorous and/or heavy duty mechanical operations. Of course, as will be understood from the following disclosure, an axial control assembly 10 in accordance with the present invention may be utilized in combination with virtually any rotatable bearing assembly including, but not limited to, a ball bearing assembly, a taper bearing assembly, etc.

In one embodiment of an axial control assembly 10 in accordance with the present invention, a bearing mount assembly 50, 50' is provided in order to secure a roller bearing assembly 20 in an operative configuration relative to a mechanical device. In at least one further embodiment, a bearing mount assembly 50, 50' is structured and disposed to fixedly secure a roller bearing assembly 20 relative to a mechanical device in an operative configuration. In yet another embodiment, a bearing mount assembly 50, 50' is structured and disposed to fixedly secure a roller bearing assembly 20 in an operative configuration with a rotatable element of a mechanical device.

Figure 1:
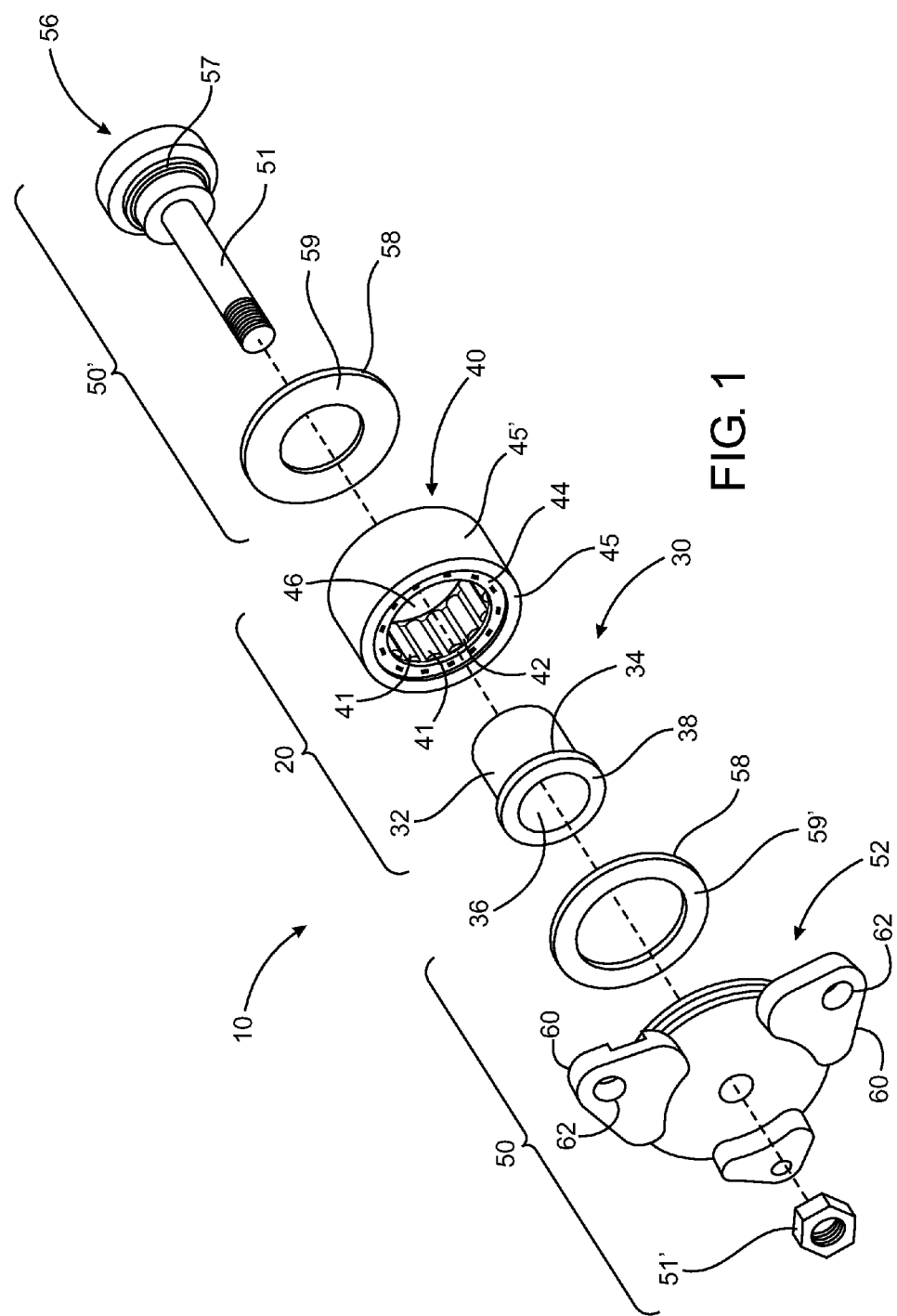
FIG. 1 is an exploded perspective view of one illustrative embodiment of an axial control assembly in accordance with the present invention.

FIG. 1 is illustrative of one embodiment of an axial control assembly 10 in accordance with the present invention, presented in an exploded perspective view. As may be seen from FIG. 1, a roller bearing assembly 20 comprises an inner bearing casing 30 and an outer bearing casing 40. Inner bearing casing 30, as shown in the illustrative embodiment in FIG. 1, comprises a generally cylindrical configuration defining an inner bearing race 32 along a substantial portion of the external surface thereof. With continued reference to the illustrative embodiment of FIG. 1, the inner bearing casing 30 comprises an inner casing flange 34 disposed at one end of the inner bearing race 32. The inner casing flange 34 is dimensioned and disposed so as to form an inner casing abutment surface 38, as is described in greater detail hereinafter. An inner casing mounting channel 36 is positioned lengthwise through the inner bearing casing 30, such as, by way of example only, as shown in the illustrative embodiment of FIG. 1.

Figure 5:
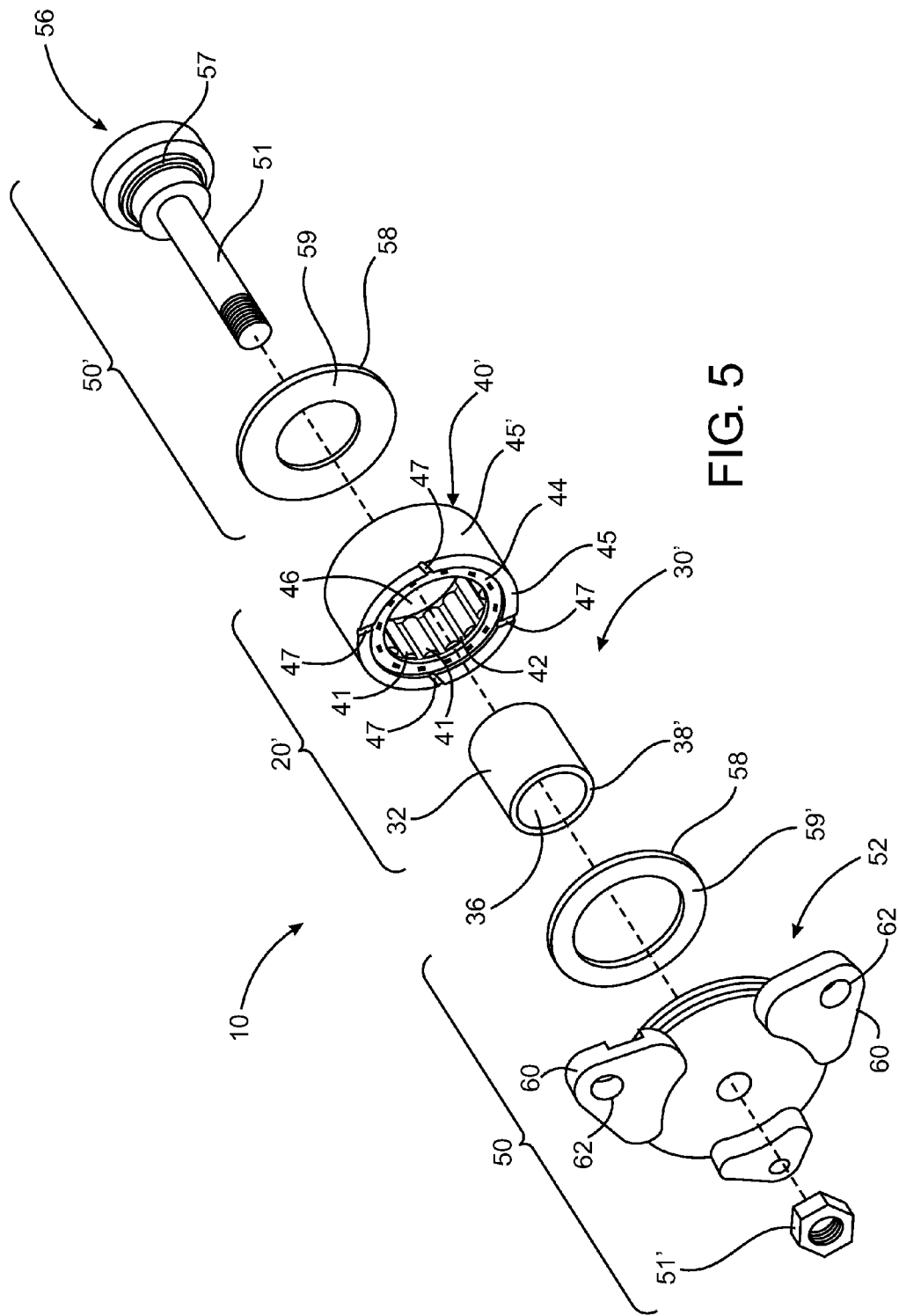
FIG. 5 is an exploded perspective view of one other illustrative embodiment of an axial control assembly in accordance with the present invention.

FIG. 5 presents an exploded perspective view of one other illustrative embodiment of an axial control assembly 10 in accordance with the present invention. In particular, as shown in the illustrative embodiment of FIG. 5, the inner bearing casing 30' once again comprises a generally cylindrical configuration defining an inner bearing race 32, however, the inner bearing casing 30' in this embodiment does not include an inner bearing flange 34, in order to facilitate lubrication of the roller bearings 41 during operation, as described in further detail below. FIG. 5 further illustrates an inner casing abutment surface 38' at an open end of the cylindrical inner bearing casing 30'.

With continued reference to the illustrative embodiment of FIG. 1, and as noted above, the roller bearing assembly 20 also comprises an outer bearing casing 40. An outer bearing race 42 is formed along an internal surface of the outer bearing casing 40. In one embodiment, a plurality of roller bearings 41 are rotatably mounted in the outer bearing race 42 of the outer bearing casing 40. In at least one embodiment, as such as is shown by way of example in FIG. 1, a bearing retainer 44 may be secured to a portion of the outer bearing casing 40 in order to securely yet rotatably retain the plurality of roller bearings 41 in the outer bearing race 42 of outer bearing casing 40.

An outer casing mounting channel 46 is disposed through the outer bearing casing 40, 40' as illustrated best in FIGS. 1 and 5. In at least one embodiment, the outer casing mounting channel 46 is dimensioned and disposed to operatively receive at least a portion of an inner bearing casing 30, 30' therethrough. As will be appreciated from the illustrative embodiments of FIGS. 1, 2, and 5, inner bearing casing 30, 30' and outer bearing casing 40, 40' are cooperatively structured such that each of the plurality of roller bearings 41 rotatably engage the inner bearing race 32 while the inner bearing casing 30, 30' is disposed within said outer casing mounting channel 46. As will be further appreciated, the inner bearing casing 30, 30' and outer bearing casing 40, 40' are generally free to move in an axial direction relative to one another, for example, upon exertion of an axial load on either of the inner bearing casing 30, 30' or outer bearing casing 40, 40' during operation of a rotatable element of a mechanical device.

The illustrative embodiment of FIG. 1 further shows an axial load surface 45 of the outer bearing casing 40 disposed in the direction which is generally perpendicular to an axis along and through outer casing mounting channel 46. FIG. 5 presents one other illustrative embodiment of an outer bearing casing 40' having an axial load surface 45 disposed in the direction which is generally perpendicular to an axis along and through outer casing mounting channel 46. Also as shown in the embodiment of FIG. 5, the axial load surface 45 comprises a plurality of lubrication channels 47 which are structured and disposed to permit excess lubricant to discharge from the interior of the outer bearing casing 40', and more in particular, from the roller bearings 41 and the outer bearing race 42, during operation, as explained in further detail below.

FIGS. 1 and 5 further illustrate a transverse load surface 45' structured and disposed to counteract a transverse load applied to the outer bearing casing 40, 40' while the roller bearing assembly 20, 20' is operatively engaged by a rotatable element of a mechanical device. In at least one embodiment, a transverse load surface 45' of an outer bearing casing 40, 40' is structured and disposed to facilitate interconnection of at least a portion of a rotatable element of a mechanical device thereto. As just one example, a portion of a gear shaft may be mounted in a substantially surrounding relation to a transverse load surface 45' of an outer bearing casing 40, 40' of a roller bearing assembly 20, 20' in accordance with the present invention.

Figure 2:
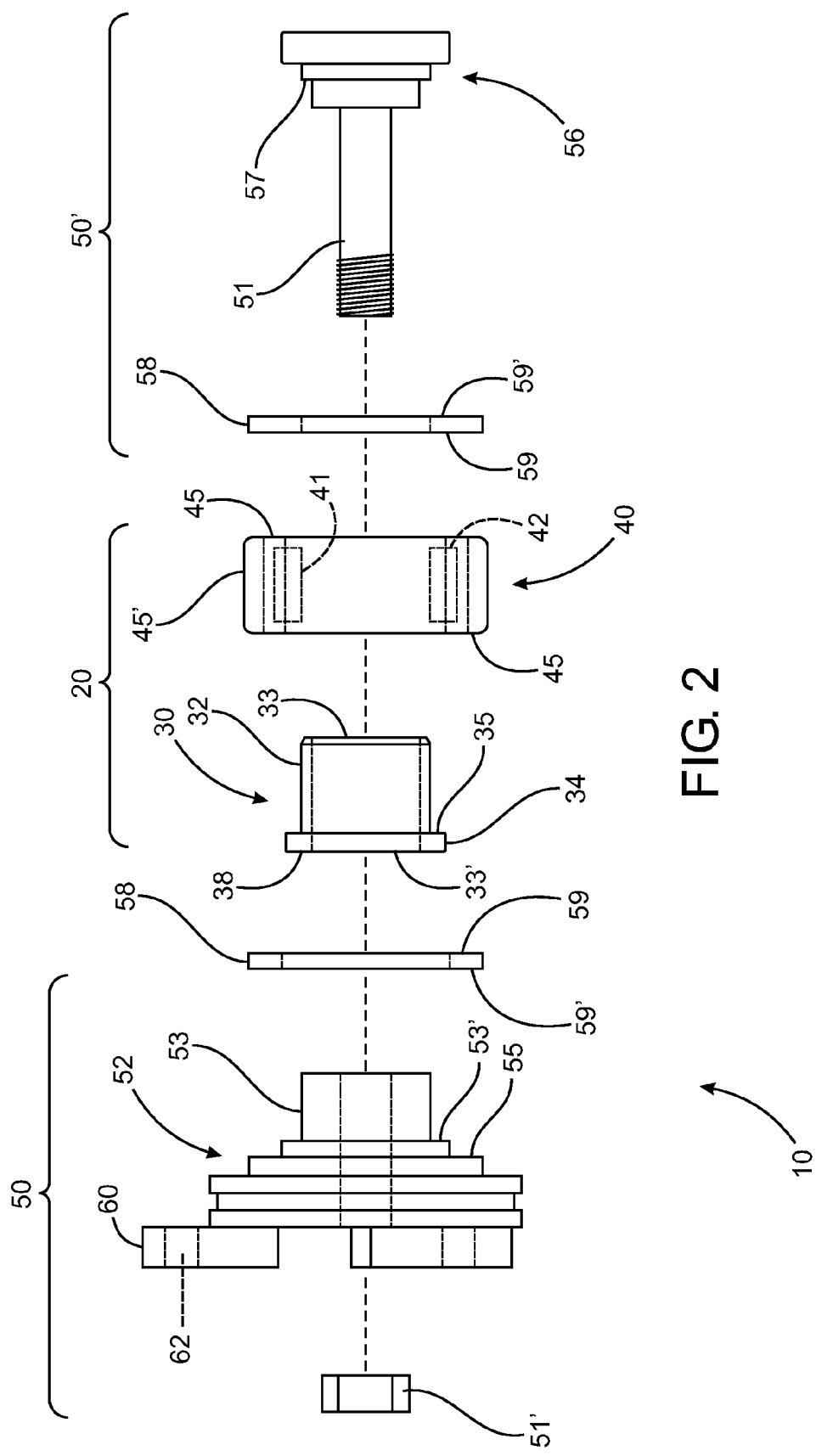
FIG. 2 is an exploded elevation of the axial control assembly of FIG. 1.
Figure 3:
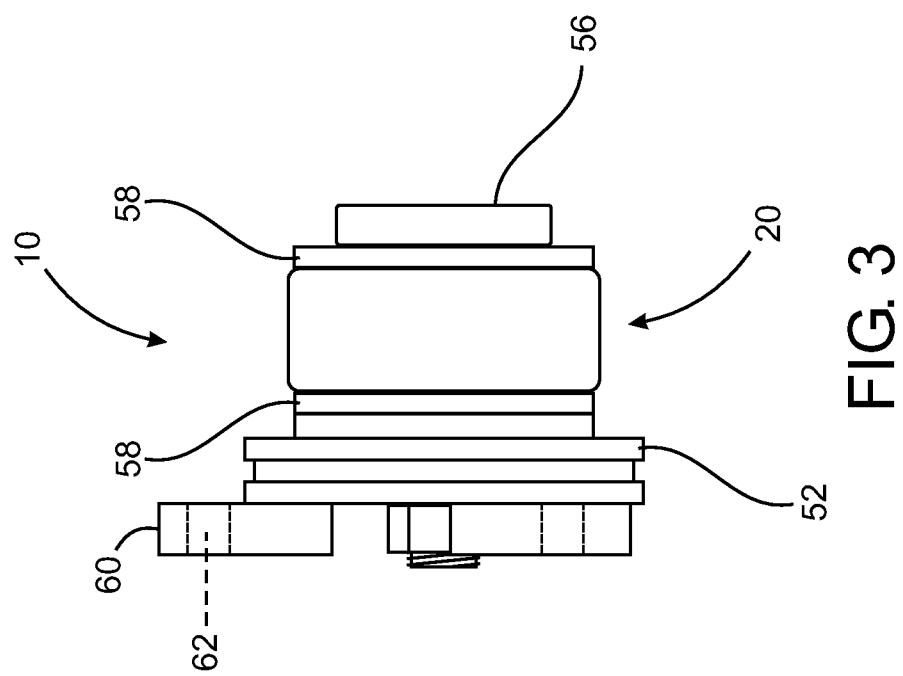
FIG. 3 is an elevation of the axial control assembly of FIG. 1 in an assembled configuration.

As such, the present invention comprises a bearing mount assembly, such as generally shown as at 50, 50'. The bearing mount assembly 50, 50' comprises a bearing mount 51 which, as shown in the illustrative embodiments of FIGS. 1, 2, and 5, comprises a cylindrical shaft having a plurality of threads along one end, the bearing mount 51 being dimensioned to pass through the inner casing mounting channel 36 and the outer casing mounting channel 46. A first bearing mount member 52, in at least one embodiment, comprises a bearing mount channel 52' dimensioned to receive at least a portion of a bearing mount 51 therethough, and in at least one further embodiment, a fastener 51' is utilized to operatively engage the portion of the bearing mount 51 in order to at least temporarily secure the roller bearing assembly 20, 20' in the bearing mount assembly 50, 50'. FIG. 3 is illustrative of one embodiment of an axial control assembly 10 in accordance with the present invention wherein a roller bearing assembly 20 is secured in place via a first bearing mount member 52, a second bearing mount member 56, and a bearing mount 51, which is at least temporarily secured in position via fastener 51'. As shown best in the illustrative embodiment of FIG. 1, the second bearing mount member 56 includes a mounting flange 57 which, in at least one embodiment, is structured to receive an open end 33 of the inner bearing race 32 while the roller bearing assembly 20 is secured in an operative configuration by the bearing mount assembly 50, 50'. Further, and as shown best in FIGS. 1, 4, and 5, the first bearing mount member 52, in at least one embodiment, comprises a plurality of mounting tabs 60 affixed thereto in a spaced relation relative to one another. Further, each of the mounting tabs 60 comprises at least one mounting aperture 62 disposed therethrough. As will be appreciated by those of skill in the art, the mounting apertures 62 are dimensioned to receive a mounting fastener (not shown), such as a bolt, screw, etc., therethrough in order to fixedly secure the first bearing mount member 52, and therefore, a bearing assembly secured therein, to a portion of an external device, such as, a mechanical device.

Figure 4:
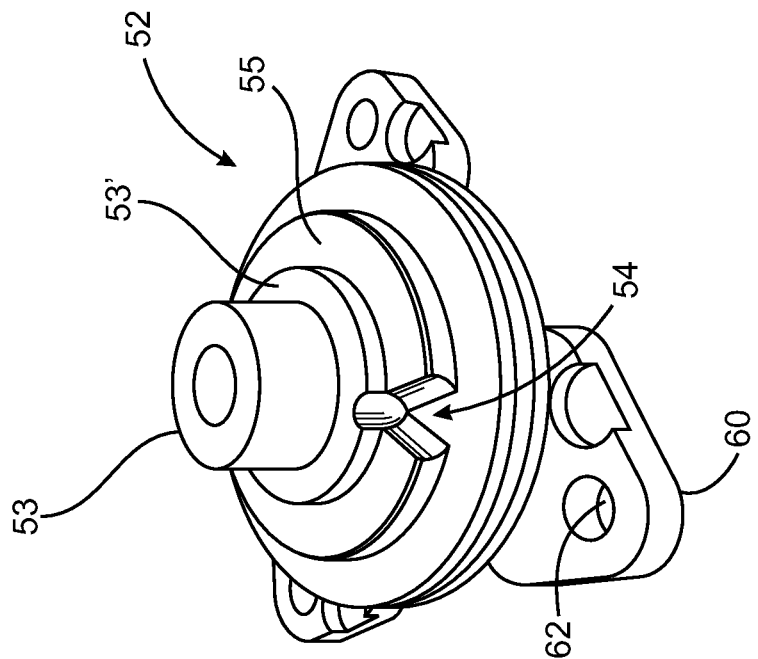
FIG. 4 is perspective view of one illustrative embodiment of a first bearing mount member in accordance with the present invention.

Looking next to the illustrative embodiment in FIG. 4, a perspective view of a first bearing mount member 52 is shown. As may be seen from FIG. 4, the first bearing mount member 52, in at least one embodiment includes an inner race mounting member 53 which is dimensioned to be operatively disposed within the inner casing mounting channel 36 of the inner bearing casing 30, 30' such that the inner bearing casing 30, 30', in at least one embodiment, is free to rotate thereabout. A bearing engagement surface 53' is positioned at the base of the inner race mounting member 53.

In at least one embodiment, a bearing engagement surface 53' comprises a slip surface 59 which, as used herein, shall mean a surface that is not processed or prepared in order to enhance frictional resistance properties thereof. Stated otherwise, a "slip surface" as used herein shall mean a surface against which an adjacent and physically engaging surface is disposed and wherein the adjacent surface is permitted to move in relation to the "slip surface" with minimal frictional resistance.

As further shown in FIG. 4, in at least one embodiment of the present invention, a first bearing mount member 52 comprises a lubrication port 54 which is structurally disposed to allow oil or other lubricant to provide lubrication between the bearing engagement surface 53' and an inner casing abutment surface 38 or 38', once again, so as to minimize frictional forces of resistance to the movement of inner bearing casing 30, 30' relative to the first bearing mount member 52.

In at least one further embodiment, the lubrication port 54 allows oil or other lubricant to be dispersed onto the surface of the inner bearing race 32 which is subsequently transferred into the outer bearing casing 40' to provide necessary lubrication for the roller bearings 41 disposed therein. In particular, and as shown the illustrative embodiment of FIG. 5, the inner bearing casing 30' does not include an inner casing flange 34 so as to permit oil or other lubricant to be dispersed over the surface of the inner bearing race 32 and onto the roller bearings 41 disposed in the outer bearing race 42 during operation. Furthermore, one or more lubrication channel 47 is disposed on the axial load surface 45 of the outer bearing casing 40', such that rotation of the roller bearing assembly 20' during operation causes excess lubricant to be discharged from the outer bearing casing 40', and more in particular, from the roller bearings 41 and the outer bearing race 42, through the lubrication channel(s) 47 via centrifugal forces.

As further illustrated in FIG. 4, in at least one embodiment, the first bearing mount member 52 also includes a control member engagement surface 55 which engages at least one surface of an axial control member 58. In at least one embodiment, the axial control member 58 comprises a slip surface 59 and an oppositely disposed friction surface 59', such as is illustrated in FIG. 2. Of course, it is understood to be within the scope and intent of the present invention for an axial control member 58 to comprise two oppositely disposed slip surfaces 59 or two oppositely disposed friction surfaces 59.

As before, as used herein a "slip surface" shall mean a surface that is not processed or prepared to enhance frictional resistance properties thereof, as opposed to a "friction surface" which is structured to increase frictional resistance properties, such as via hardening or other metallurgical processing, or via mechanical processing, such as mechanically abrading the surface itself. Stated otherwise, a "slip surface" as used herein shall mean a surface against which an adjacent and physically engaging surface is disposed and wherein the adjacent surface is permitted to move in relation to the "slip surface" with minimal frictional resistance, and a "friction surface" as used herein shall mean a surface against which an adjacent and physically engaging surface is disposed and wherein the adjacent surface is not permitted to move freely in relation to the "friction surface" as a result of frictional resistance.

In the illustrative embodiment of FIG. 2, the slip surface 59 of each axial control member 58 is disposed in an abutting relation a different one of the oppositely disposed axial load surfaces 45 of the outer bearing casing 40, while the friction surface 59' of the axial load members 58 are disposed in an abutting relation to one of the control member engagement surface 55 of the first bearing mount member 52 or the mounting flange 57 of the second bearing mount member 56. Thus, in this configuration, the axial control members 58 are substantially retained in a fixed position via frictional forces between the friction surfaces 59' and corresponding control member engagement surface 55 or the mounting flange 57, which the outer bearing casing 40 is free to rotate between the slip surfaces 59 of the axial control members 58. Reference to FIG. 3 better illustrates the interaction of the axial control members 58 while disposed in an operative orientation with roller bearing assembly 20.

Once again, it is within the scope and intent of the present invention for the axial load surfaces 45 of the outer bearing casing 40, 40' to comprise one slip surface and one friction surface, or both slip surfaces, or both friction surfaces. Similarly, it is also within the scope and intent of the present invention for the control member engagement surface 55, and the mounting flange 57 to comprise either a slip surface or a friction surface.

As will be appreciated from the foregoing, the present axial control assembly 10 permits the selective balancing of axial control versus freedom of movement of the components of a moveable bearing assembly, such as roller bearing assembly 20, 20' by selecting the specific combination of slip surfaces and friction surfaces of the axial control members 58, axial load surfaces 45 of outer bearing assembly 40, 40' and action of the control member engagement surface 55, and the mounting flange 57, which are disposed in an abutting relation to one another.

More importantly, FIG. 3 illustrates that when the axial control assembly 10 of the present invention is disposed in an operative orientation with roller bearing assembly 20, axial control members 58 are disposed in a substantially overlying and abutting relation to the axial load surfaces (not shown) of the outer bearing casing (not shown). Further, each axial control members 58 is secured in position along oppositely disposed axial load surfaces of the outer bearing casing via one of the first bearing mount member 52 and second bearing mount member 56. As such, the axial control members 58 are secured in position to counteract an axial load generated by an external device and to limit axial movement of the outer bearing casing relative to the inner bearing casing.

Although shown throughout the figures comprising a corresponding pair of axial control members 58, it is understood to be within the scope and intent of the present invention for an axial control assembly 10 to comprise a single axial control member 58, wherein the single axial control member 58 is disposed in an overlying and abutting relation to either axial load surface 45 of an outer bearing casing 40, 40'.

Since many modifications, variations and changes in detail can be made to the described embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An axial control assembly wherein a portion of said assembly is mounted in an operative configuration to a mechanical device with at least one mounting fastener, said assembly comprising:
 a roller bearing assembly and a bearing mount assembly,
 said bearing mount assembly comprising a first bearing mount member and a second bearing mount member,
 said first bearing mount member comprising at least one mounting tab having a mounting aperture disposed therethrough, said at least one mounting aperture facilitates mounting said first bearing mount member to a portion of the mechanical device with the at least one mounting fastener,
 said roller bearing assembly being secured in an operative configuration by said bearing mount assembly,
 said roller bearing assembly comprising an inner bearing casing and an outer bearing casing, wherein said outer bearing casing is disposed in an operative overlying relation to said inner bearing casing,
 a plurality of roller bearings rotatably mounted in said bearing assembly,
 said outer bearing casing comprising a transverse load surface and at least one axial load surface, said transverse load surface disposed to counteract a transverse load generated by the mechanical device,
 said bearing mount assembly comprising at least one axial control member,
 said at least one axial control member disposed in an abutting relation to said at least one axial load surface of said outer bearing casing while said bearing assembly is secured in said operative configuration by said bearing mount assembly, and
 said at least one axial control member positioned to counteract an axial load generated by the mechanical device and to limit axial movement of said outer bearing casing relative to said inner bearing casing.

2. The assembly as recited in claim 1 wherein said at least one axial control member comprises a substantially circular configuration having an inner face and an outer face.

3. The assembly as recited in claim 2 wherein at least one of said inner face or said outer face of said axial control member comprises a friction surface.

4. The assembly as recited in claim 3 wherein said friction surface comprises a hardened surface.

5. The assembly as recited in claim 3 wherein each of said inner face and said outer face of said axial control member comprise a friction surface.

6. The assembly as recited in claim 2 wherein said inner face of said at least one axial control member is dimensioned to overlie a substantial majority of said at least one axial control surface of said outer bearing casing.

7. The assembly as recited in claim 1 wherein said at least one axial control surface of said outer bearing casing comprises a friction surface.

8. The assembly as recited in claim 7 wherein said friction surface comprises a hardened surface.

9. The assembly as recited in claim 1 wherein said first bearing mount member comprises a bearing engagement surface.

10. The assembly as recited in claim 9 wherein said outer bearing casing comprises spaced apart and oppositely disposed axial load surfaces and at least one of said spaced apart and oppositely disposed axial load surfaces is disposed in an abutting relation to said bearing engagement surface while said bearing assembly is secured by said bearing mount assembly, said bearing engagement surface counteracts an axial load generated by the mechanical device, thereby further limiting axial movement of said outer bearing casing relative to said inner bearing casing.

11. The assembly as recited in claim 1 wherein said outer bearing casing comprises a plurality of spaced apart and oppositely disposed axial load surfaces.

12. The assembly as recited in claim 11 wherein said transverse load surface is positioned substantially perpendicular to each of said spaced apart and oppositely disposed axial load surfaces.

13. The assembly as recited in claim 11 wherein at least one of said spaced apart and oppositely disposed axial load surfaces comprises a friction surface.

14. The assembly as recited in claim 11 wherein said bearing mount assembly comprises a plurality of axial control members, each of said plurality of axial control members being disposed in an abutting relation to a different one of each of said spaced apart and oppositely disposed axial load surfaces of said outer bearing casing thereby further limiting axial movement of said outer bearing casing relative to said inner bearing casing.

15. The assembly as recited in claim 14 wherein at least one of said plurality of axial control members comprises a friction surface disposed in an abutting relation to at least one of said plurality of spaced apart and oppositely disposed axial load surfaces of said outer bearing casing.

16. The assembly as recited in claim 14 wherein at least one of said plurality of spaced apart and oppositely disposed axial load surfaces comprises a friction surface, said friction surface disposed in an abutting relation to at least one of said axial control members.

17. An axial control assembly is mounted in an operative configuration to a mechanical device with a plurality of mounting fasteners, and said assembly is operatively engaged with a rotatable element of the mechanical device, said assembly comprising:

a roller bearing assembly and a bearing mount assembly, said bearing mount assembly comprising a first bearing mount member and a second bearing mount member, said first bearing mount member comprising a plurality of mounting tabs each having a mounting aperture disposed therethrough, each said mounting aperture facilitates mounting said first bearing mount member to a portion of the mechanical device with one the plurality of mounting fasteners, said roller bearing assembly being fixedly secured in an operative configuration by said bearing mount assembly, said roller bearing assembly comprising an inner bearing casing and an outer bearing casing, wherein said outer bearing casing is disposed in an operative overlying relation to said inner bearing casing, said inner bearing casing comprising an inner bearing race and said outer bearing casing comprising an outer bearing race, a plurality of cylindrical roller bearings rotatably mounted in said bearing assembly between said inner bearing race and said outer bearing race, said outer bearing casing comprising a transverse load surface and a pair of spaced apart and oppositely disposed axial load surfaces, said transverse load surface of said outer bearing casing structured to operatively engage the rotatable element of the mechanical device to facilitate rotational movement of the rotatable element and said outer bearing casing relative to the mechanical device, said transverse load surface disposed to counteract a transverse load generated by the rotatable element of the mechanical device, said bearing mount assembly comprises at least one axial control member, said at least one axial control member disposed in an abutting relation to at least one of said spaced apart and oppositely disposed axial load surfaces of said outer bearing casing while said bearing assembly is fixedly secured by said bearing mount assembly, and said at least one axial control member positioned to counteract an axial load generated by the rotatable element of the mechanical device and limit axial movement of said outer bearing casing relative to said inner bearing casing while the rotatable element rotates relative to the mechanical device.

18. The assembly as recited in claim 17 wherein said bearing mount assembly comprises a plurality of axial control members, each of said plurality of axial control members being disposed in an abutting relation to a different one of said spaced apart and oppositely disposed axial load surfaces of said outer bearing casing and positioned to counteract the axial load generated by the rotatable element of the mechanical device and limit axial movement of said outer bearing casing relative to said inner bearing casing while the rotatable element and said outer bearing casing rotates relative to the mechanical device.

19. The assembly as recited in claim 18 wherein at least one of said plurality of axial control members comprises a friction surface disposed in an abutting relation to at least one of said spaced apart and oppositely disposed axial load surfaces of said outer bearing casing.

\* \* \* \* \*